United States Patent

Deckers et al.

Patent Number: 5,457,157
Date of Patent: Oct. 10, 1995

[54] TRANSPARENT, IMPACT-RESISTANT MOLDING MATERIALS

[75] Inventors: Andreas Deckers, Ludwigshafen; Norbert Guentherberg, Speyer; Kristin Tiefensee, Westheim, all of Germany

[73] Assignee: BASF Aktiengesellschaft, Ludwigshafen, Germany

[21] Appl. No.: 174,338

[22] Filed: Dec. 28, 1993

[30] Foreign Application Priority Data

Dec. 30, 1992 [DE] Germany ............... 42 44 510.8

[51] Int. Cl.$^6$ ............... C08L 51/04; C08L 33/04
[52] U.S. Cl. ............... 525/80; 525/73; 525/83; 525/84; 525/85; 525/76; 525/77
[58] Field of Search ............... 525/80, 73, 83, 525/85, 84, 77, 76

[56] References Cited

U.S. PATENT DOCUMENTS

| | | | |
|---|---|---|---|
| 4,393,164 | 7/1983 | McKee et al. | 525/83 |
| 4,440,905 | 4/1984 | Dunkelberger | 525/66 |
| 4,539,375 | 9/1985 | Dunkelberger | 525/260 |
| 4,595,727 | 6/1986 | Doak | 525/80 |
| 4,727,117 | 2/1988 | Hallen-Abberton et al. | 525/343 |
| 5,047,475 | 9/1991 | Ogawa et al. | 525/73 |
| 5,237,004 | 8/1993 | Wu et al. | 525/85 |

FOREIGN PATENT DOCUMENTS

| | | |
|---|---|---|
| 062223 | 10/1982 | European Pat. Off. |
| 095274 | 11/1983 | European Pat. Off. |
| 216505 | 4/1987 | European Pat. Off. |
| 4114589 | 11/1992 | Germany |

*Primary Examiner*—James J. Seidleck
*Assistant Examiner*—M. L. Warzel
*Attorney, Agent, or Firm*—Keil & Weinkauf

[57] ABSTRACT

Molding materials contain from 5 to 50% by weight of a first polymer obtained by polymerizing a $C_1$–$C_{20}$-alkyl ester of methacrylic or acrylic acid;

from 5 to 50% by weight of a second polymer obtained by polymerizing a monomer mixture of from 75 to 82% by weight of a vinyl aromatic monomer and from 18 to 25% by weight of acrylonitrile or methacrylonitrile;

from 10 to 40% by weight of a third polymer containing from 10 to 90% by weight of units of the general formula I

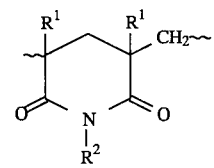

where $R^1$ is hydrogen or $C_1$–$C_4$-alkyl and $R^2$ is $C_1$–$C_{18}$-alkyl, $C_5$–$C_{12}$-cycloalkyl, $C_6$–$C_{10}$-aryl or $C_6$–$C_{10}$-aryl-$C_1$–$C_4$-alkyl, and from 10 to 90% by weight of a $C_1$–$C_{20}$-alkyl ester of methacrylic or acrylic acid;

from 5 to 60% by weight of a graft copolymer having a mean particle diameter (weight average) of less than 200 nm and obtained by polymerizing from 20 to 70% by weight of a monomer mixture of from 30 to 100% by weight of a $C_1$–$C_{20}$-alkyl ester of methacrylic or acrylic acid and from 0 to 70% by weight of a vinyl aromatic monomer in the pressure of from 30 to 80% by weight of a grafting base, obtained by polymerizing at least one monomer selected from the group consisting of butadiene, isoprene, vinylaromatic monomers and $C_4$–$C_{20}$-alkyl esters of acrylic acid; and from 0 to 20% by weight, of conventional additives. The difference between the refractive index of the graft copolymer and that of the mixture of the first, second and third polymers being less than 0.01.

5 Claims, No Drawings

TRANSPARENT, IMPACT-RESISTANT MOLDING MATERIALS

The present invention relates to transparent, impact-resistant molding materials, containing essentially A) from 5 to 50% by weight of a polymer obtainable by polymerizing a $C_1$–$C_{20}$-alkyl ester of methacrylic or acrylic acid or a mixture of such esters, B) from 5 to 50% by weight of a polymer obtainable by polymerizing a monomer mixture of $b_1$) from 75 to 82% by weight of a vinylaromatic aromatic monomer and $b_2$) from 18 to 25% by weight of acrylonitrile or methacrylonitrile or a mixture thereof, C) from 10 to 40% by weight of a polymer containing $c_1$) from 10 to 90% by weight of units of the general formula I

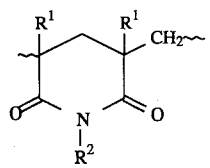

where $R^1$ is hydrogen or $C_1$–$C_4$-alkyl and $R^2$ is $C_1$–$C_{18}$-alkyl, $C_5$–$C_{12}$-cycloalkyl, $C_6$–$C_{10}$-aryl or $C_6$–$C_{10}$-aryl-$C_1$–$C_4$-alkyl, where these radicals, with the exception of the $C_1$–$C_4$-alkyl groups, may be monosubstituted to trisubstituted by radicals selected from the group consisting of $C_1$–$C_4$-alkyl, $C_1$–$C_4$-alkoxy and halogen, and $c_2$) from 10 to 90% by weight of a $C_1$–$C_{20}$-alkyl ester of methacrylic or acrylic acid or a mixture of such esters, D) from 5 to 60% by weight of a graft copolymer having a mean particle diameter (weight average) of less than 200 nm and obtainable by polymerizing from 20 to 70% by weight of a monomer mixture of $d_1$) from 30 to 100% by weight of a $C_1$–$C_{20}$-alkyl ester of methacrylic or acrylic acid or a mixture of such esters and $d_2$) from 0 to 70% by weight of a vinylaromatic monomer in the presence of from 30 to 80% by weight of a grafting base, obtainable by polymerizing at least one monomer selected from the group consisting of butadiene, isoprene, vinylaromatic monomers and $C_4$–$C_{20}$-alkyl esters of acrylic acid, and E) from 0 to 20% by weight, based on the amount of components A) to D), of conventional additives, the stated amounts of components A) to D) summing to 100 and the difference between the refractive index of component D) and that of the mixture of components A), B) and C) and, if desired, E) being less than 0.01.

The present invention furthermore relates to a process for the preparation of these transparent, impact-resistant molding materials, their use for the production of moldings, and moldings containing these transparent molding materials.

Transparent blends of polymethyl methacrylate (PMMA), styrene/acrylonitrile copolymer (SAN) and a graft rubber are disclosed, for example, in European Patent 62,223. Such blends have good impact strength in conjunction with transparency. However, the disadvantage of these molding materials is the insufficient heat distortion resistance.

It is known that the heat distortion resistances of SAN copolymers can be increased. European Patent 95,274 describes compatible and therefore transparent blends of SAN and a methacrylamide-containing polymer. Toughening by means of a graft rubber is likewise claimed; however, these materials generally lose their transparency.

European Patent 216,505 describes molding materials based on SAN or ABS (acrylonitrile/butadiene/styrene copolymers) in combination with a polyglutarimide. Here too, mixing does not lead to a blend which is suitable for the production of optically demanding moldings.

European Patent 216,505 also claims polymer blends of a polymethacrylimide (PMI) and PMMA. However, these are two-phase blends, ie. they have two glass transition temperatures and are therefore not transparent. Moreover, the Vicat temperature is only slightly higher than that of PMMA.

It is an object of the present invention to provide transparent, impact-resistant molding materials having improved heat distortion resistance.

We have found that this object is achieved by the transparent, impact-resistant molding materials defined at the outset.

We have also found a process for the preparation of these transparent, impact-resistant molding materials, their use for the production of moldings, and moldings containing these transparent, impact-resistant molding materials.

The polymers present as component A) are obtainable, according to the invention, by polymerizing a $C_1$–$C_{20}$-alkyl ester of methacrylic or acrylic acid or a mixture of such esters, preferably by polymerizing a monomer mixture consisting of $a_1$) from 80 to 100, preferably from 90 to 99, % by weight of a $C_1$–$C_{20}$-alkyl ester of methacrylic acid and $a_2$) from 0 to 20, preferably from 1 to 10, % by weight of a $C_1$–$C_{20}$-alkyl ester of acrylic acid.

Preferred $C_1$–$C_{20}$-alkyl esters of methacrylic acid are the $C_1$–$C_4$-alkyl esters, such as methyl methacrylate (MMA), ethyl methacrylate, n-propyl methacrylate, isopropyl methacrylate, n-butyl methacrylate, isobutyl methacrylate and tert-butyl methacrylate, methyl methacrylate being particularly preferred, and mixtures of these monomers.

Preferably used $C_1$–$C_{20}$-alkyl esters of acrylic acid are the $C_1$—$C_4$-alkyl esters, such as methyl acrylate (MA), ethyl acrylate, propyl acrylate, n-butyl acrylate, isobutyl acrylate and tert-butyl acrylate, methyl acrylate being particularly preferred, and mixtures of these monomers.

Observations to date have shown that polymers of 99% by weight of methyl methacrylate and 1% by weight of methyl acrylate, having a weight average molecular weight ($M_w$) of from 60,000 to 300,000, in particular from 80,000 to 150,000, g/mol, and polymers of 96% by weight of methyl methacrylate and 4% by weight of butyl acrylate, having a weight average molecular weight ($M_w$) of from 60,000 to 300,000, in particular 110,000, g/mol, are particularly advantageous.

The amount of component A is, according to the invention, from 5 to 50, preferably from 15 to 30, % by weight, based on the total weight of the transparent, impact-resistant molding materials.

The preparation of component A) is carried out in general by a known polymerization process, such as mass, solution, emulsion or bead polymerization. Such processes are described, for example, in Kunststoffhandbuch, Vol. 9, Vieweg and Esser; Polymethylmethacrylat, Carl-Hanser-Verlag, Munich, 1975, page 36 et seq.

The copolymers (SAN copolymers) present as component B) are obtainable by polymerizing a monomer mixture of from 75 to 82, preferably from 78 to 81, % by weight of a vinylaromatic monomer and from 18 to 25, preferably from 19 to 22, % by weight of acrylonitrile or methacrylonitrile or a mixture thereof.

Outside this range of composition, cloudy moldings which have joint lines are generally obtained at processing temperatures above 240° C.

Preferred vinylaromatic monomers are styrene, α-methylstyrene, tert-butylstyrene, monochlorostyrene and vinyltoluene, particularly preferably styrene and α-methylstyrene.

The addition of acrylonitrile and/or methacrylonitrile generally results in an increase in the stress cracking resistance.

SAN copolymers having a weight average molecular weight ($M_w$) of from 60,000 to 300,000, preferably from 100,000 to 200,000, g/mol have proven particularly suitable and have been prepared by the process described in British Patent 1,472,195.

The amount of component B) is, according to the invention, from 5 to 50, preferably from 15 to 40, % by weight, based on the total weight of the transparent, impact-resistant molding materials.

The preparation of component B) is carried out, as a rule, by known polymerization processes, such as mass, solution, emulsion or bead polymerization. Such processes are described, for example, in Kunststoffhandbuch, Editors Vieweg and Daumiller, Volume V; Polystyrol, Carl-Hanser-Verlag, Munich 1969, page 124 et seq. and in British Patent 1,472,195.

The polymers present as component C) contain, according to the invention, $c_1$) from 10 to 90, preferably from 50 to 90, % by weight of units of the general formula I

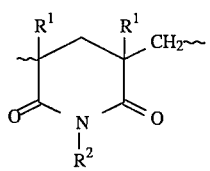

where $R^1$ is hydrogen or $C_1$–$C_4$-alkyl and $R^2$ is $C_1$–$C_4$-alkyl, $C_5$–$C_8$-cycloalkyl, $C_6$–$C_{10}$-aryl or $C_6$–$C_{10}$-aryl-$C_1$–$C_4$-alkyl, where these radicals, with the exception of the $C_1$–$C_4$-alkyl groups, may be monosubstituted to trisubstituted by radicals selected from the group consisting of $C_1$–$C_4$-alkyl, $C_1$–$C_4$-alkoxy and halogen,
and $c_2$) from 90 to 10, preferably 50 to 10, % by weight of a $C_1$–$C_{20}$-alkyl ester of methacrylic or acrylic acid or a mixture of such esters.

Component C) is prepared in general by imidation of polymers based on $C_1$–$C_{20}$-alkyl esters of methacrylic or acrylic acid, or mixtures of such esters, with primary amines.

Polymers based on $C_1$–$C_{20}$-alkyl esters of (meth)acrylic acid are to be understood as being both homopolymers and copolymers, and the copolymers may furthermore contain other ethylenically unsaturated comonomers.

Preferred $C_1$–$C_{20}$-alkyl esters of methacrylic acid are the $C_1$–$C_4$-alkyl esters, such as methyl methacrylate (MMA), ethyl methacrylate, n-propyl methacrylate, isopropyl methacrylate, n-butyl methacrylate, isobutyl methacrylate and tert-butyl methacrylate, methyl methacrylate being particularly preferred, and mixtures of these monomers.

Preferably used $C_1$–$C_{20}$-alkyl esters of acrylic acid are the $C_1$–$C_4$-alkyl esters, such as methyl acrylate (MA), ethyl acrylate, n-propyl acrylate, isopropyl acrylate, n-butyl acrylate, isobutyl acrylate and tertbutyl acrylate, methyl acrylate being particularly preferred, and mixtures of these monomers.

In general, the polymers comprise more than 50, preferably more than 80, % by weight of $C_1$–$C_{20}$-alkyl esters of methacrylic acid and acrylic acid. Observations to date have shown that polymers of from 80 to 100% by weight of methyl methacrylate and from 0 to 20% by weight of methyl acrylate, having a molecular weight ($M_w$) of from 20,000 to 300,000 g/mol, are particularly advantageous.

The primary amine $R^2NH_2$ used is in general one selected from the group consisting of $C_1$–$C_{18}$-alkylamine, $C_5$–$C_{12}$-cycloalkylamines, $C_6$–$C_{10}$-arylamines and $C_6$–$C_{10}$-aryl-$C_1$–$C_4$-alkylamines, where the cycloalkyl, aryl and arylalkyl constituents of the amines may be monosubstituted to trisubstituted by radicals selected from the group consisting of $C_1$–$C_4$-alkyl, $C_1$–$C_4$-alkoxy and halogen, such as fluorine, chlorine and bromine.

Examples are methylamine, ethylamine, n-propylamine, isopropylamine, n-butylamine, 1-methylpropylamine, 2-methylpropylamine, 1,1-dimethylethylamine, n-pentylamine, 1-methylbutylamine, 2-methylbutylamine, 3-methylbutylamine, 2-dimethylpropylamine, 1-ethylpropylamine, n-hexylamine, n-heptylamine, n-octylamine, n-nonylamine, n-decylamine, n-undecylamine, n-dodecylamine, stearylamine, cyclopentylamine, cyclohexylamine, cycloheptylamine, cyclooctylamine, cyclododecylamine, aniline, 2-, 3- and 4-methylaniline, 2-, 3- and 4-methoxyaniline, 2-, 3- and 4-chloroaniline, 2-, 3- and 4-bromoaniline, benzylamine, phenethylamine and phenylpropylamine, particularly preferably methylamine and cyclohexylamine.

The weight ratio of amine used to acrylate polymer is chosen in general in the range from 10:1 to 1:1, preferably from 2:1 to 1:1, so that the content of imidated units I is from 10 to 90% by weight of component C). Otherwise, the degree of imidation can be influenced by the conventional process parameters, for example the temperature.

The imidation is carried out in general in a conventional manner, for example in the presence of solvents as described in EP-A 234,726, or without additional solvent, as in U.S. Pat. No. 4,246,374, in an extruder. The preparation of component C) in an extruder whose reaction zone has a length/diameter (L/D) ratio of from 20 to 50, preferably from 30 to 40, is particularly preferred. An L/D ratio of more than 50 results, as a rule, in damage to the material together with a yellow coloration, owing to an excessively long residence time. An L/D ratio of less than 20 gives in general only a partially imidated product having a high content of secondary amide groups, which have a disadvantageous effect on the melt viscosity and water absorption.

Conventional elements, such as kneading blocks or toothed mixing elements, may be used as mixing elements for homogenizing the reaction mixture.

The reaction temperature is chosen, as a rule, in the range from 250° to 350° C., preferably from 270° to 350° C.

The pH is chosen as a rule to be above 7, owing to the amine used.

The reaction time during mixing in the extruder is preferably from 1 to 20, preferably from 2 to 10, min, and that in the solution is longer, preferably from 2 to 20, hours.

Furthermore, catalysts may be added to the reaction mixture, in amounts of from 0.01 to 10% by weight, based on the polymer used, in order to accelerate the reaction. Examples are tertiary amines, such as tricylcohexylamine;

substituted guanidines, such as 1,1,3,3-tetramethylguanidine and 1,3-diphenylguanidine;

tetrasubstituted alkylammonium compounds, such as trimethylstearylammonium chloride;

organic titanium compounds, such as tetrapropoxytitanium and tetrabutoxytitanium;

organic tin compounds, such as dibutyltin oxide and dibutyltin didodecanoate;

aromatic amines, such as quinoline, isoquinoline, 4-benzylpyridine, 4-phenylpyridine, 2-hydroxypyridine, 1,3-, 1,4- and 2,3-benzodiazine and 2,2'-, 2,3'- and 2,4'-bipyridyl;

imides, such as N,N'-dicyclohexylcarbodiimide, and antimony trioxide, tin dioxide, sodium amide, sodium alcoholates and potassium alcoholates, such as sodium methylate and potassium methylate, ammonium chloride and ammonium iodide.

The catalysts can be added before, during or after the mixing process, preferably after said process.

In a further preferred embodiment, the (main) extruder contains, after the reaction zone, a devolatilization zone, ie. at least one orifice through which volatile components and nonpolymeric reaction products can be removed. The devolatilization can be carried out both at atmospheric pressure and under reduced pressure. The use of devolatilization under atmospheric pressure in combination with devolatilization under reduced pressure has proven particularly advantageous.

Partially imidated polymers which have a weight average molecular weight ($M_w$) of from 60,000 to 300,000, preferably from 100,000 to 200,000, g/mol, measured in dimethylformamide by light scattering, have proven particularly advantageous. Particularly preferred components C) are those having an acid number of not more than 0.4, in particular from 0.01 to 0.2, meq/g, The amount of component C) is, according to the invention, from 10 to 40, preferably from 10 to 30, % by weight, based on the total weight of the transparent, impact-resistant molding materials.

The graft copolymers present as component D) and having a mean particle diameter (weight average) of less than 200 nm obtainable by polymerizing from 20 to 70, preferably from 30 to 60, % by weight of a monomer mixture of from 30 to 100, preferably from 40 to 90, % by weight of a $C_1$–$C_{20}$-alkyl ester of methacrylic or acrylic acid or a mixture of such esters and from 0 to 70, preferably from 10 to 60, % by weight of a vinylaromatic monomer in the presence of from 30 to 80, preferably from 40 to 70, % by weight of a grafting base, obtainable by polymerizing at least one monomer selected from the group consisting of butadiene, isoprene, vinylaromatic monomers and $C_4$–$C_{20}$-alkyl esters of acrylic acid.

Preferred $C_1$–$C_{20}$-alkyl esters of methacrylic acid are the $C_1$–$C_4$-alkyl esters, such as methyl methacrylate (MMA), ethyl methacrylate, n-propyl methacrylate, isopropyl methacrylate, n-butyl methacrylate, isobutyl methacrylate and tert-butyl methacrylate, methyl methacrylate being particularly preferred, and mixtures of these monomers.

Preferably used $C_1$–$C_{20}$-alkyl esters of acrylic acid are the $C_1$–$C_4$-alkyl esters, such as methyl acrylate (MA), ethyl acrylate, n-propyl acrylate, isopropyl acrylate, n-butyl acrylate, isobutyl acrylate and tertbutyl acrylate, methyl acrylate being particularly preferred, and mixtures of these monomers.

Preferred vinylaromatic monomers are styrene, α-methylstyrene, tert-butylstyrene, monochlorostyrene and vinyltoluene, particularly preferably styrene and α-methylstyrene.

$C_4$–$C_8$-alkyl esters, such as n-butyl acrylate, isobutyl acrylate, tert-butyl acrylate, n-pentyl acrylate, n-hexyl acrylate, n-heptyl acrylate, n-octyl acrylate and 2-ethylhexyl acrylate, particularly preferably n-butyl acrylate and 2-ethylhexyl acrylate, and mixtures of these monomers are preferably used as $C_4$–$C_{20}$-alkyl esters of acrylic acid, as a component of the grafting base.

Observations to date have shown that polymers of from 50 to 100, in particular from 60 to 80, % by weight of butadiene and from 0 to 50, in particular from 20 to 40, % by weight of styrene have proven particularly useful as grafting bases.

Observations to date have shown that polymers of from 10 to 100% by weight of methyl methacrylate, from 0 to 20, preferably from 1 to 10, % by weight of a $C_1$–$C_4$-alkyl ester of acrylic acid, in particular n-butyl acrylate, and from 0 to 70, preferably from 1 to 60, particularly preferably from 10 to 55, % by weight of styrene have proven particularly useful as grafts.

When more than one monomer is used in the graft, a shell-like structure may be advantageous. This is achieved by adding the various monomers or monomer mixtures after the polymerization of each of the monomers of a shell.

Component D) advantageously has a glass transition temperature of less than 0° C. Furthermore, the mean particle size is, according to the invention, from 0.05 to 0.2 µm, preferably from 0.08 to 0.2 µm. Observations to date have shown that no transparent molding materials are obtained outside the particle size range according to the invention.

The preparation of the graft copolymer (component D)) is carried out in general in a conventional manner by emulsion polymerization, as described, for example, in German Laid-Open Application DOS 1,420,775 and British Patent 649, 166. After the preparation, component D) is isolated in general by a known method, such as coagulation or spray drying.

The amount of component D) is, according to the invention, from 5 to 60, preferably from 20 to 50, % by weight, based on the total weight of the transparent, impact-resistant molding materials.

According to the invention, the difference between the refractive index of component D) and that of the mixture of components A), B) and C) and, if desired, E) is less than 0.01. Otherwise, observations to date show that transparent molding materials are not obtained.

The novel adaptation of the refractive indices is effected by appropriately choosing the composition (amounts of monomers) of components A), B) and C) on the one hand and D) on the other hand. As a rule, the required monomer ratios of the copolymers are based on the refractive index of the particular homopolymers; for example, the refractive index of a styrene/butadiene copolymer has in each case the intermediate value arising from the weight fraction of the amounts of styrene and butadiene monomer, if $n^{25}_D$ for polystyrene is taken as 1.59–1.60 and that for polybutadiene as 1.516 (cf. Brandrup-Immergut, Polymer Handbook, 2nd Edition, New York 1987).

The novel molding materials may furthermore contain up to 20% by weight, based on the mixture of components A) to D), of conventional additives. Examples of suitable additives are:

dyes;

antioxidants and heat stabilizers, such as sterically hindered phenols, phosphites and derivatives and substituted members of this group and mixtures of these compounds, preferably in concentrations of up to 1% by weight, based on the weight of the mixture;

UV stabilizers, such as substituted salicylates, benzotriazoles and benzophenones, as well as HALS (hindered amine light stabilizers), such as the succinic esters stated in EP-A 243 319 or glutaric esters of 2,2,6,6-tetramethylpiperidin-4-ol and bis(2,2,6,6-tetramethyl-4piperidyl) sebacate, which can be used in general in amounts of up to 1% by weight;

lubricants and mold release agents, which, as a rule, can be added to the thermoplastic material in an amount of up to 3% by weight, for example stearic acid, stearates, stearyl alcohol, alkyl stearates and stearamides, as well as esters of pentaerythritol with long-chain fatty acids, and antistatic agents.

Mixing of components A) to D) or E) can be carried out, as a rule, in the conventional apparatuses for mixing melts, such as twin-screw extruders. The components are processed in general at from 200° to 300° C. In principle, it is also possible to mix solutions or suspensions of the novel components and then to remove the solvent or suspending agent.

Observations to date have shown that the processing range of the novel, transparent, impact-resistant molding materials above 200° C. is not limited by incompatibility phenomena. The mixtures of components A) to D) or E) can be processed at from 200° to 300° C. without losses of transparency, without noticeable yellowing and without troublesome odor production.

Moldings can be produced from the novel molding materials by injection molding or blow molding. The molding materials can also be pressed, calendered, extruded or vacuum formed.

The novel, transparent, impact-resistant molding materials have very good transparency and improved heat distortion resistance compared with those of the prior art.

Observations to date have shown that moldings produced by injection molding have no joint line marks at all and possess high transparency and high surface gloss.

EXAMPLES

The mean particle sizes in all cases are the weight average of the particle sizes which are determined by means of an analytical ultracentrifuge according to the method of W. Scholtan and H. Lange, Kolloid-Z. und Z. Polymere 250 (1972), 782–796. The ultracentrifuge measurement gives the integral mass distribution of the particle diameter of a sample. From this it is possible to determine the percentage by weight of the particles which have a diameter equal to or less than a certain size. The mean particle diameter, which is also referred to as the $d_{50}$ value of the integral mass distribution, is defined as the particle diameter at which 50% by weight of the particles have a diameter smaller than the diameter which corresponds to the $d_{50}$ value. Likewise, 50% by weight of the particles then have a diameter greater than the $d_{50}$ value.

The following components were used for the Examples and Comparative Examples below: Components used:

$A_1$: Copolymer of 96 parts by weight of methyl methacrylate (MMA) and 4 parts by weight of n-butyl acrylate, $M_w$=110,000 (determined by gel permeation chromatography (GPC) in tetrahydrofuran (THF)) ($n^{25}_D$=1.492)

$A_2$: Copolymer of 99 parts by weight of MMA and 1 part by weight of methyl acrylate, $M_w$=110,000 (determined by GPC in THF) ($n^{25}_D$=1.492)

$B_1$: Copolymer of styrene and acrylonitrile in a ratio of 81:19 ($n^{25}_D$=1.575), $M_w$=250,000 (determined by light scattering in $CHCl_3$)

$C_1$: Copolymer of 87 parts by weight of I ($R^1$=$R^2$=$CH_3$) and 13 parts by weight of MMA; viscosity number =70 (measured in dimethylformamide (DMF) as a 0.26% strength by weight solution), acid number =0.03 meq/g ($n^{25}_D$=1.540)

$C_2$: Copolymer of 74 parts by weight of I ($R^1$=$R^2$=$CH_3$) and 26 parts by weight MMA; viscosity number =82 (measured in DMF as a 0.26% strength by weight solution), acid number =0.02 meq/g ($n^{25}_D$=1.530)

$D_1$: Graft copolymer of 45 parts by weight of a mixture of 51 parts by weight of MMA, 44 parts by weight of styrene and 5 parts by weight of n-butyl acrylate on 55 parts by weight of an elastomeric base consisting of 72 parts by weight of butadiene and 28 parts by weight of styrene ($n^{25}_D$=1.537); the mean particle size (weight average) was determined as 130 nm.

The compositions of the mixtures and the results of the optical evaluation and of the mechanical properties are shown in the Table below.

The notched impact strength $a_k$ (insertion temperature: 250° C./test temperature: 23° C.) was determined on standard small bars in accordance with DIN 53,453.

The heat distortion resistance Vicut B 50 was measured in accordance with DIN 54,460.

The modulus of elasticity was determined in accordance with DIN 53,457.

TABLE

| No. | Components (parts by weight) | | | | | | Properties | | | |
|---|---|---|---|---|---|---|---|---|---|---|
| | $A_1$ | $A_2$ | $B_1$ | $C_1$ | $C_2$ | $D_1$ | Modulus of elasticity [N/mm²] | $a_k$ [KJ/m²] | Vicat [°C.] | Optical |
| 1 | 22.8 | — | 28.4 | 12.8 | — | 36.0 | 2020 | 3.3 | 91 | transparent |
| 2 | 20.0 | — | 24.8 | 19.2 | — | 36.0 | 2000 | 3.5 | 92 | transparent |
| 3 | 17.1 | — | 21.3 | 25.6 | — | 36.0 | 2050 | 3.7 | 93 | transparent |
| 4 | — | 22.8 | 28.4 | — | 12.8 | 36.0 | 1860 | 3.0 | 97 | transparent |
| 5 | — | 17.1 | 21.3 | — | 25.6 | 36.0 | 2050 | 3.0 | 101 | transparent |
| 6 | — | 17.1 | 21.3 | — | 17.6 | 44.0 | 1770 | 4.1 | 90 | transparent |

TABLE-continued

| | Components (parts by weight) | | | | | | Properties | | | |
| --- | --- | --- | --- | --- | --- | --- | --- | --- | --- | --- |
| | | | | | | | Modulus of elasticity | $a_k$ | Vicat | |
| No. | $A_1$ | $A_2$ | $B_1$ | $C_1$ | $C_2$ | $D_1$ | [N/mm²] | [KJ/m²] | [°C.] | Optical |
| For comparison | | | | | | | | | | |
| 7 | — | 28.5 | 35.5 | — | — | 36.0 | 1980 | 2.7 | 94 | transparent |
| 8 | 28.5 | — | 35.5 | — | — | 36.0 | 1980 | 2.5 | 89 | transparent |

We claim:

1. A transparent, impact-resistant molding material consisting essentially of
   A) from 17.1 to 22.8% by weight based on the weight of the molding material, of a polymer obtained by polymerizing a $C_1$–$C_{20}$-alkyl ester of methacrylic or acrylic acid or a mixture of such esters,
   B) from 21.3 to 28.4% by weight based on the weight of the molding material, of a polymer obtained by polymerizing a monomer mixture of
      $b_1$ from 75 to 82% by weight based on the weight of B, of a vinyl aromatic monomer and
      $b_2$ from 18 to 25% by weight based on the weight of B, of acrylonitrile or methacrylonitrile or a mixture thereof,
   C) from 12.8 to 25.6% by weight, based on the weight of the molding material, of a polymer containing
      $c_1$ from 10 to 90% by weight, based on the weight of C), of the formula I

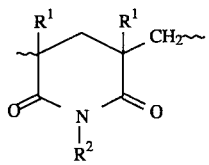

where $R^1$ is hydrogen or $C_1$–$C_4$-alkyl and $R^2$ is $C_1$–$C_{18}$-alkyl, $C_5$–$C_{12}$-cycloalkyl, $C_6$–$C_{10}$-aryl or $C_6$–$C_{10}$-aryl-$C_1$–$C_4$-alkyl, where these radicals, with the exception of the $C_1$–$C_4$-alkyl groups, may be monosubstituted to trisubstituted by radicals selected from the group consisting of $C_1$–$C_4$-alkyl, $C_1$–$C_4$-alkoxy and halogen, and from 10 to 90% by weight, based on the weight of C), of a $C_1$–$C_{20}$-alkyl ester of methacrylic or acrylic acid or a mixture of such esters,
   D) from 36.0 to 44.0% by weight, based on the weight of C), of a graft copolymer having a mean particle diameter (weight average) of less than 200 nm and obtained by polymerizing from 20 to 70% by weight based on the weight of D, of a monomer mixture consisting of
      $d_1$) from 30 to 100% by weight based on the weight of the monomer mixture of a $C_1$–$C_{20}$-alkyl ester of methacrylic or acrylic acid or a mixture of such esters and
      $d_2$) from 0 to 70% by weight, based on the weight of the monomer mixture of a vinyl aromatic monomer in the presence of from 30 to 80% by weight, based on the weight of the monomer mixture of a grafting base, obtained by polymerizing at least one monomer selected from the group consisting of butadiene, isoprene, vinylaromatic monomers and $C_4$–$C_{20}$-alkyl esters of acrylic acid,
   and
   E) from 0 to 20% by weight, based on the amount of components A) to D), of conventional additives, the stated amounts of components A) to D) summing to 100 and the difference between the refractive index of component D) and that of the mixture of components A), B), C) and E) being less than 0.01.

2. A transparent, impact-resistant molding material as claimed in claim 1, wherein component A) is prepared from a monomer mixture comprising
   $a_1$) from 80 to 100% by weight, based on the weight of A), of a $C_1$–$C_{20}$-alkyl ester of methacrylic acid and
   $a_2$) from 0 to 20% by weight, based on the weight of A), of a $C_1$–$C_{20}$-alkyl ester of acrylic acid.

3. A transparent, impact-resistant molding material as claimed in claim 1, wherein component C) has an acid number of not more than 0.4 meq/g.

4. A molding obtained from the transparent, impact-resistant molding material as claimed in claim 1.

5. A process for the preparation of a transparent, impact-resistant molding material, consisting essentially of
   A) from 17.1 to 22.8% by weight based on the weight of the molding material, of a polymer obtained by polymerizing a $C_1$–$C_{20}$-alkyl ester of methacrylic or acrylic acid or a mixture of such esters,
   B) from 21.3 to 28.4% by weight based on the weight of the molding material, of a polymer obtained by polymerizing a monomer mixture of
      $b_1$) from 75% to 82% by weight based on the weight of B, of a vinyl-aromatic monomer and
      $b_2$) from 18 to 25% by weight based on the weight of B, of acrylonitrile or methacrylonitrile or a mixture thereof,
   c) from 12.8 to 25.6% by weight, based on the weight of the molding material, of a polymer containing
      $c_1$) from 10 to 90% by weight, based on the weight of C), of the formula I

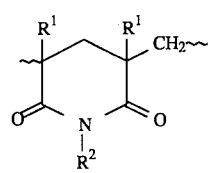

wherein $R^1$ is hydrogen or $C_1$–$C_4$-alkyl and $R^2$ is $C_1$–$C_{18}$-alkyl, $C_5$–$C_{12}$-cycloalkyl, $C_6$–$C_{10}$-aryl or $C_6$–$C_{10}$-aryl-$C_1$–$C_4$-alkyl, where these radicals, with the exception of the $C_1$–$C_4$-alkyl groups, may be monosubstituted to trisubstituted by radicals selected from the group consisting of $C_1$–$C_4$-alkyl, $C_1$–$C_4$-alkoxy and halogen, and from 10 to 90% by weight, based on the weight of C), of a $C_1$–$C_{20}$-alkyl ester of methacrylic or acrylic acid or a mixture of such esters, D) from 36.0 to 44% by weight, based on the weight of C), of a graft copolymer having a mean particle diameter (weight average) of less than 200 nm and obtained by polymerizing from 20 to 70% by weight based on the weight of D, of a monomer mixture consisting of $d_1$) from 30 to 100% by weight based on the weight of the monomer mixture of a $C_1$–$C_{20}$-alkyl ester of methacrylic or acrylic acid or a mixture of such esters and $d_2$) from 0 to 70% by weight, based on the weight of the monomer mixture of a vinyl aromatic monomer in the presence of from 30 to 80% by weight, based on the weight of the monomer mixture of a grafting base, obtained by polymerizing at least one monomer selected from the group consisting of butadiene, isoprene, vinylaromatic monomers and $C_4$–$C_{20}$-alkyl esters of acrylic acid, and E) from 0 to 20% by weight, based on the amount of components A) to D), of conventional additives, the stated amounts of components A) to D) summing to 100 and the difference between the refractive index of component D) and that of the mixture of components A), B), C) and E) being less than 0.01, wherein components A to D and, optionally E are mixed in their melt.

* * * * *